June 24, 1930.　　　C. T. SMALL　　　1,766,263
CAN FILLING MACHINE
Filed Feb. 17, 1926　　15 Sheets-Sheet 1

INVENTOR
C. T. SMALL
BY E.E. Huffman
ATTORNEY

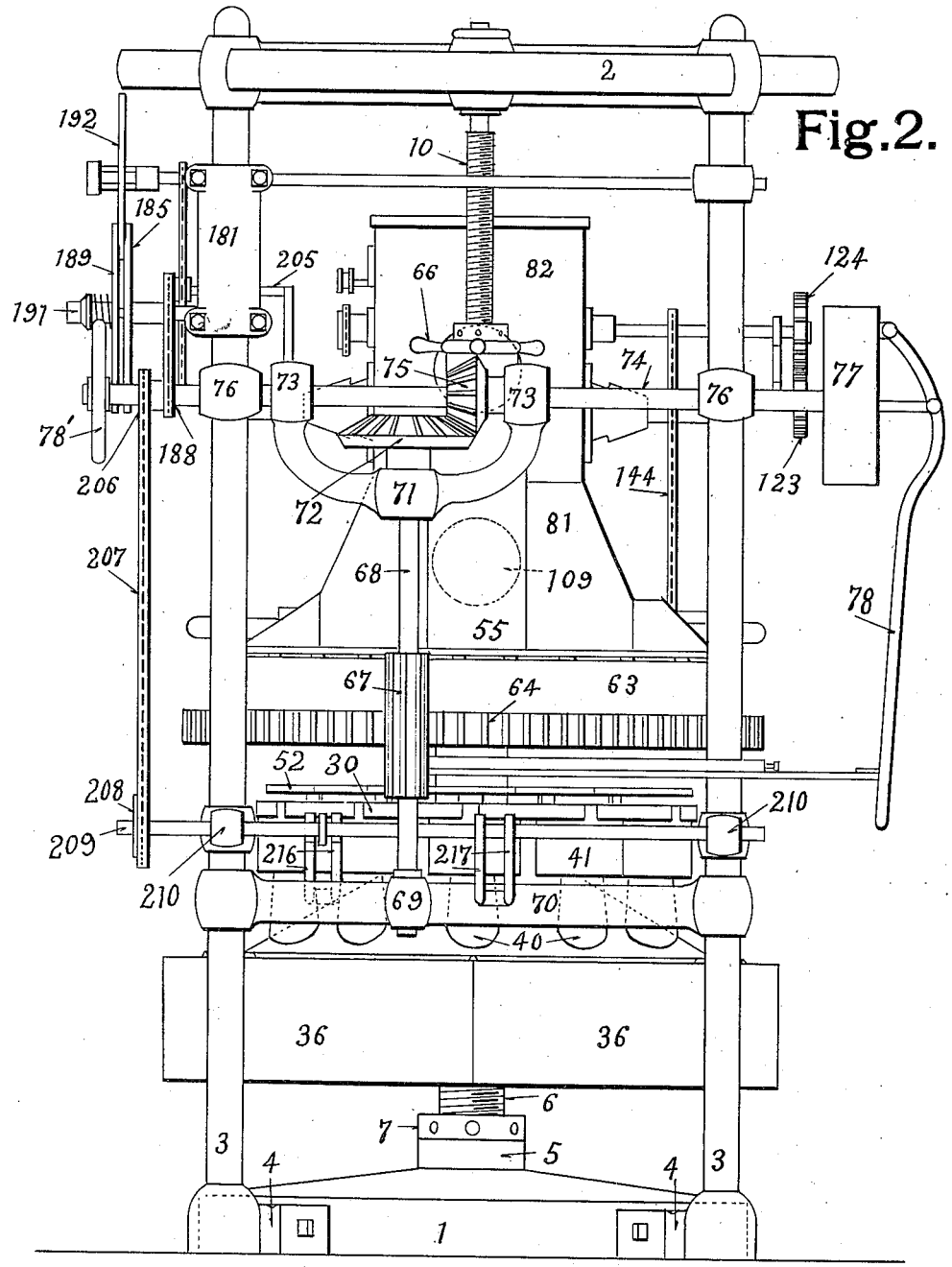

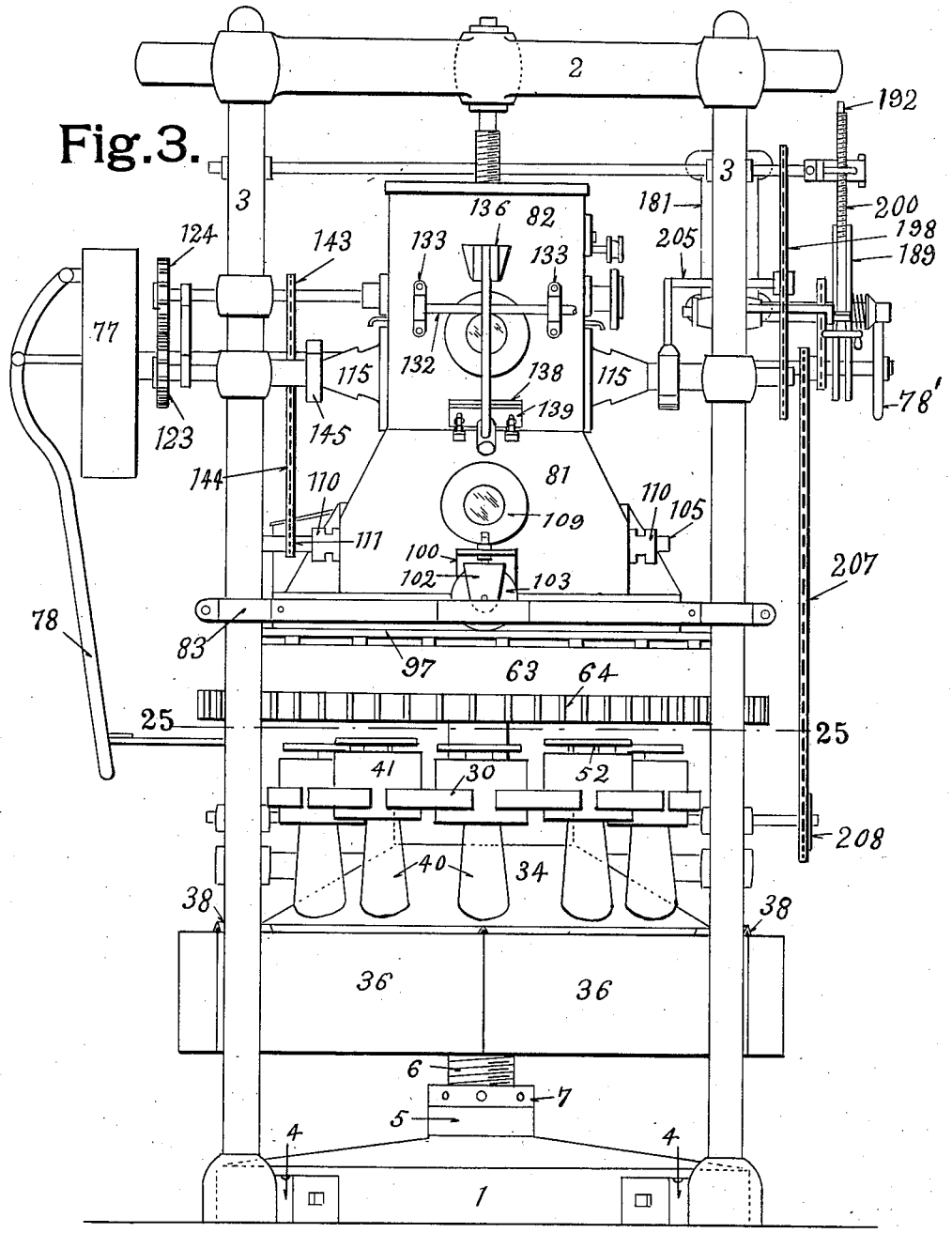

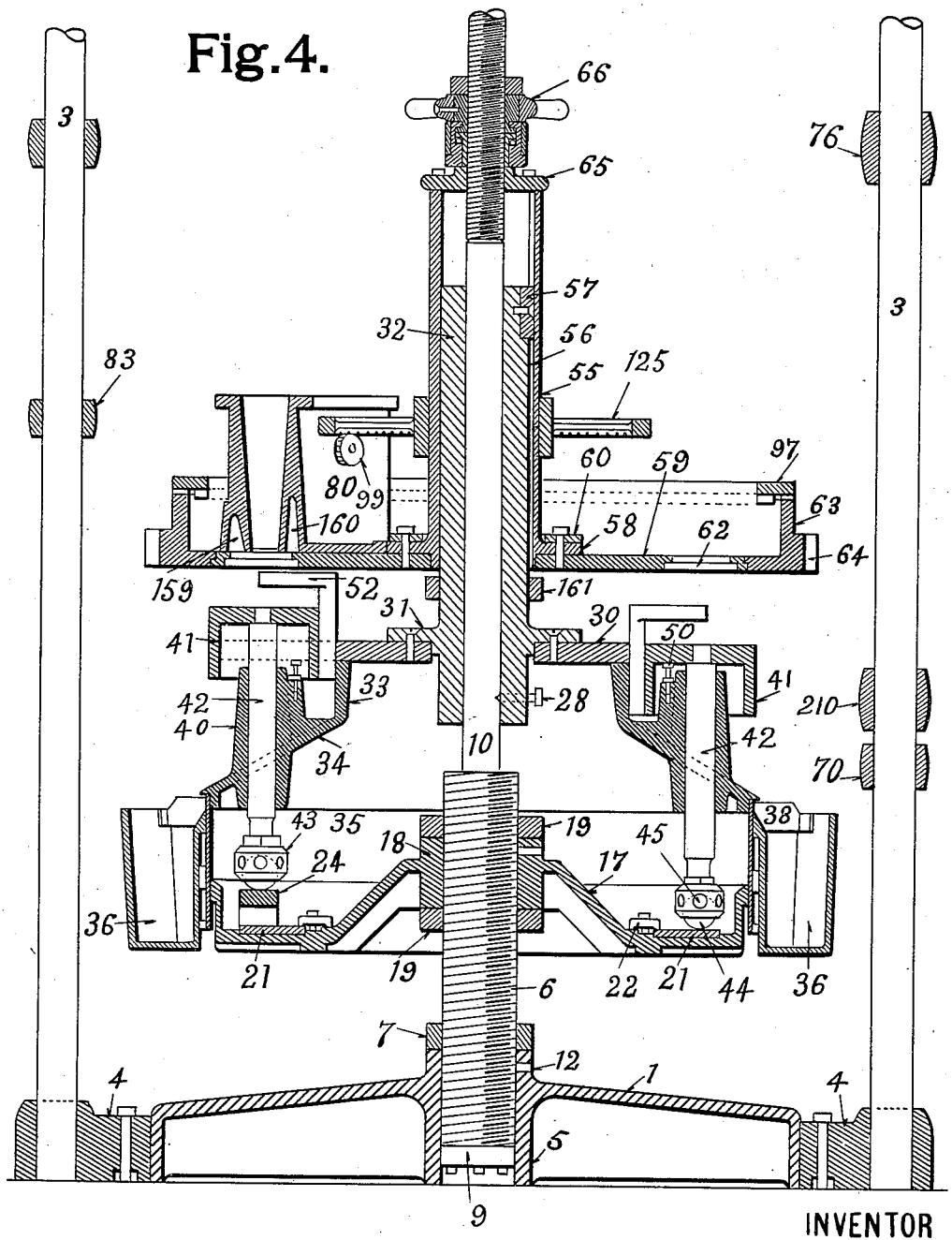

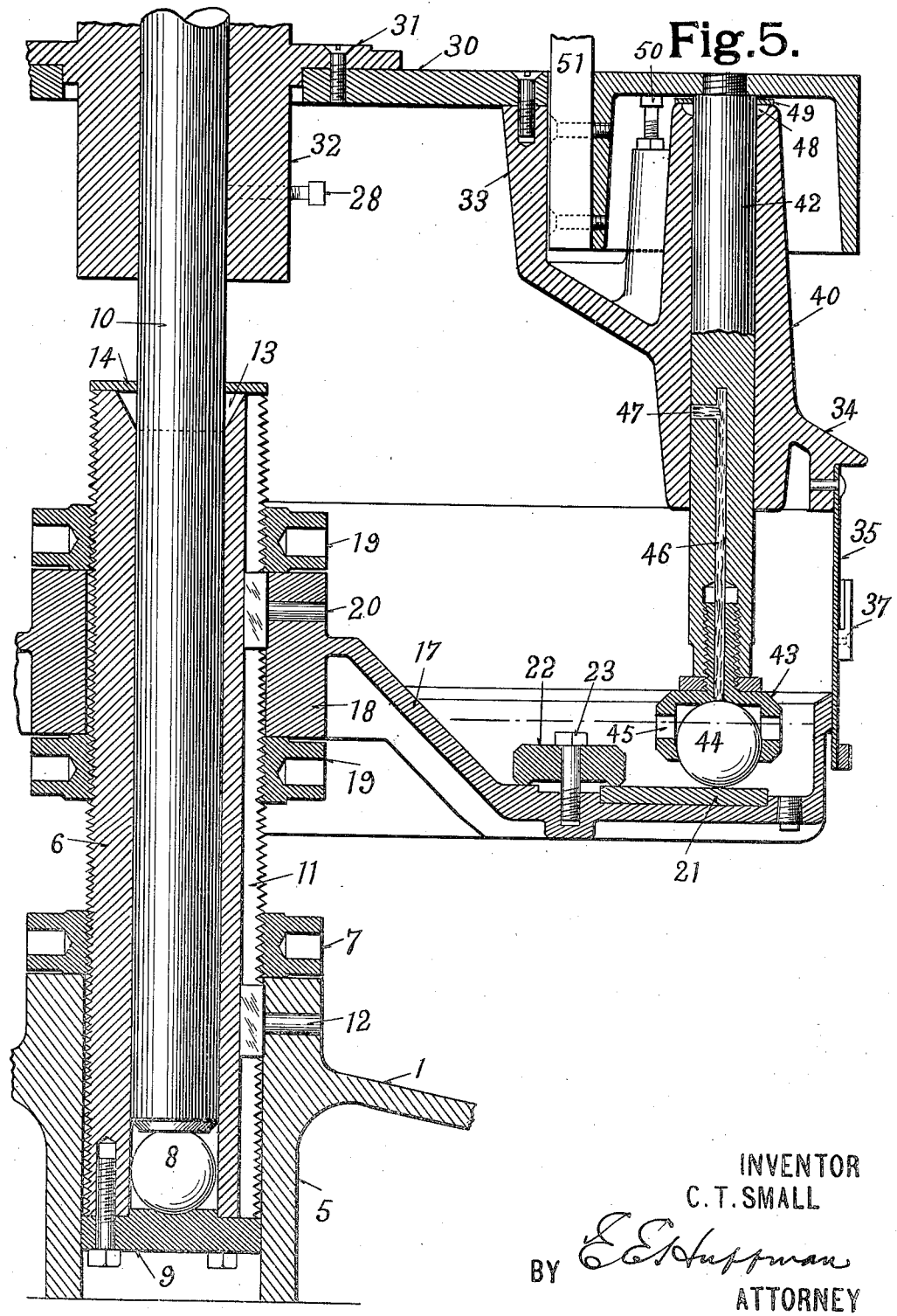

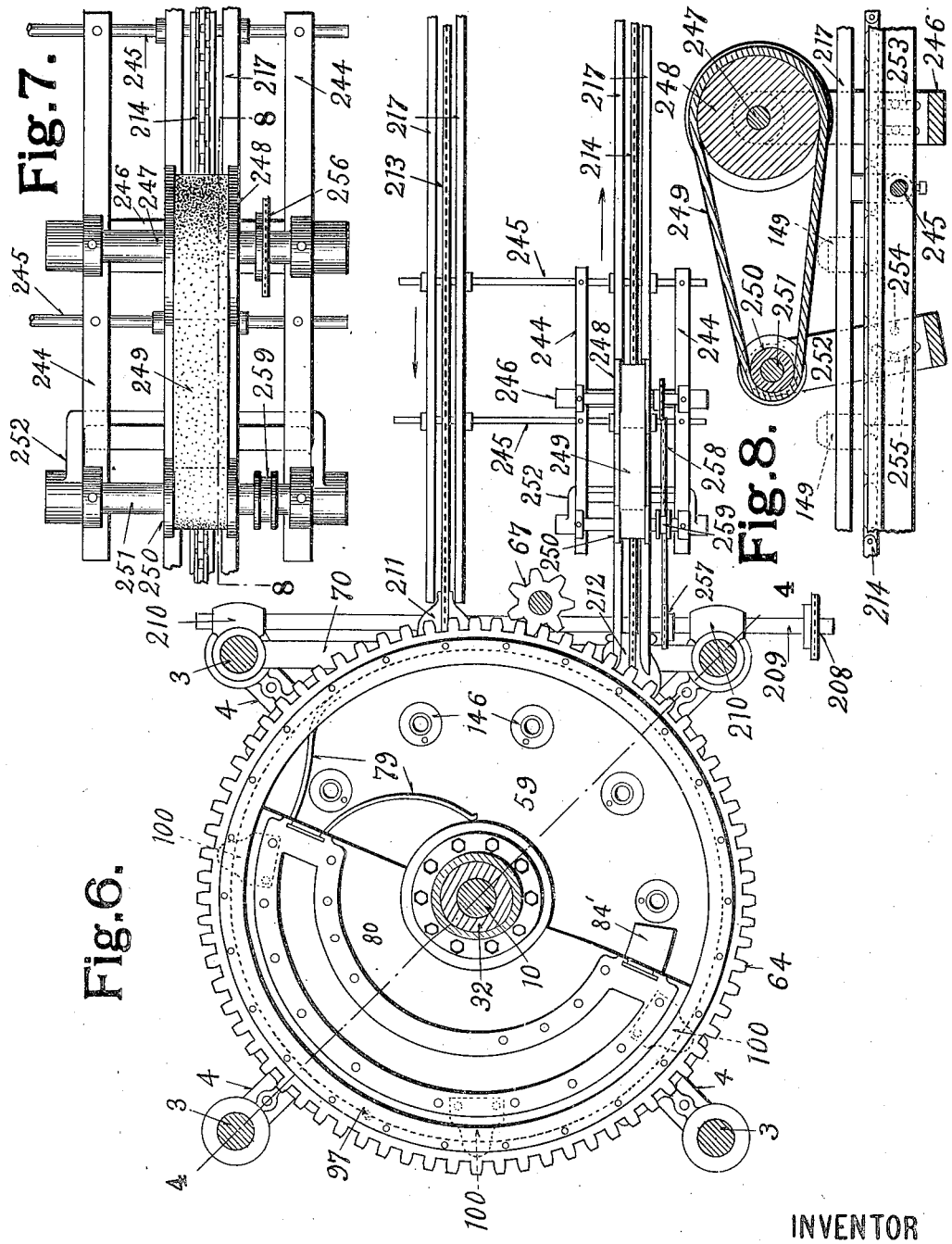

June 24, 1930.   C. T. SMALL   1,766,263
CAN FILLING MACHINE
Filed Feb. 17, 1926   15 Sheets-Sheet 7

INVENTOR
C.T.SMALL
BY
ATTORNEY

June 24, 1930.  C. T. SMALL  1,766,263
CAN FILLING MACHINE
Filed Feb. 17, 1926  15 Sheets-Sheet 8

INVENTOR
C.T.SMALL
BY  *E. E. Huffman*
ATTORNEY

June 24, 1930. C. T. SMALL 1,766,263
CAN FILLING MACHINE
Filed Feb. 17, 1926 15 Sheets-Sheet 9
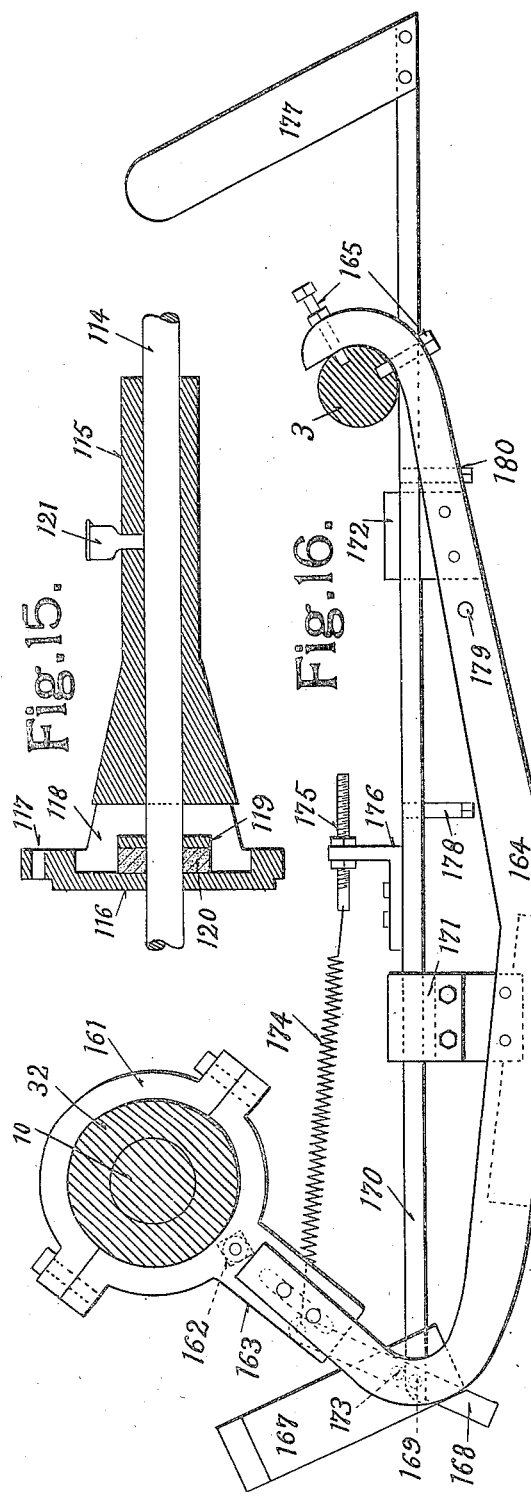
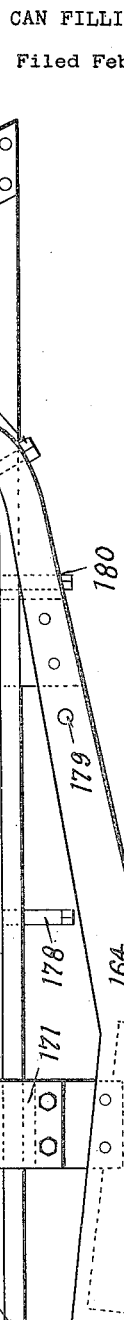
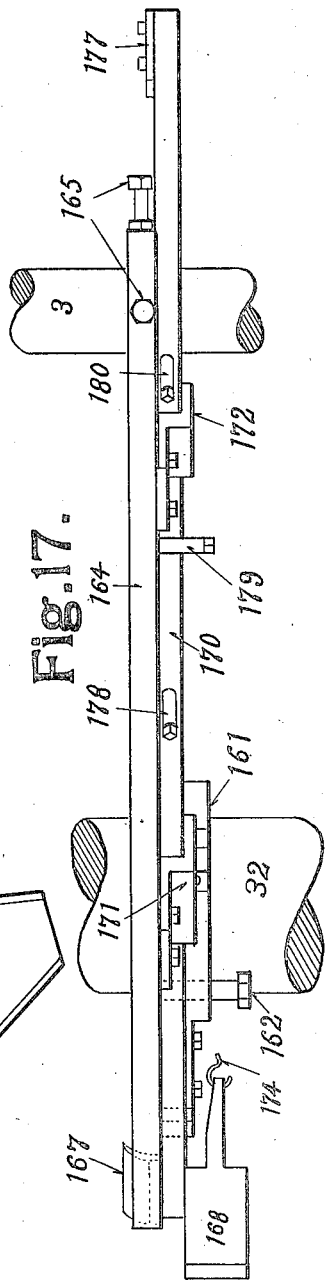
INVENTOR
C.T. SMALL
BY E.E. Huffman
ATTORNEY

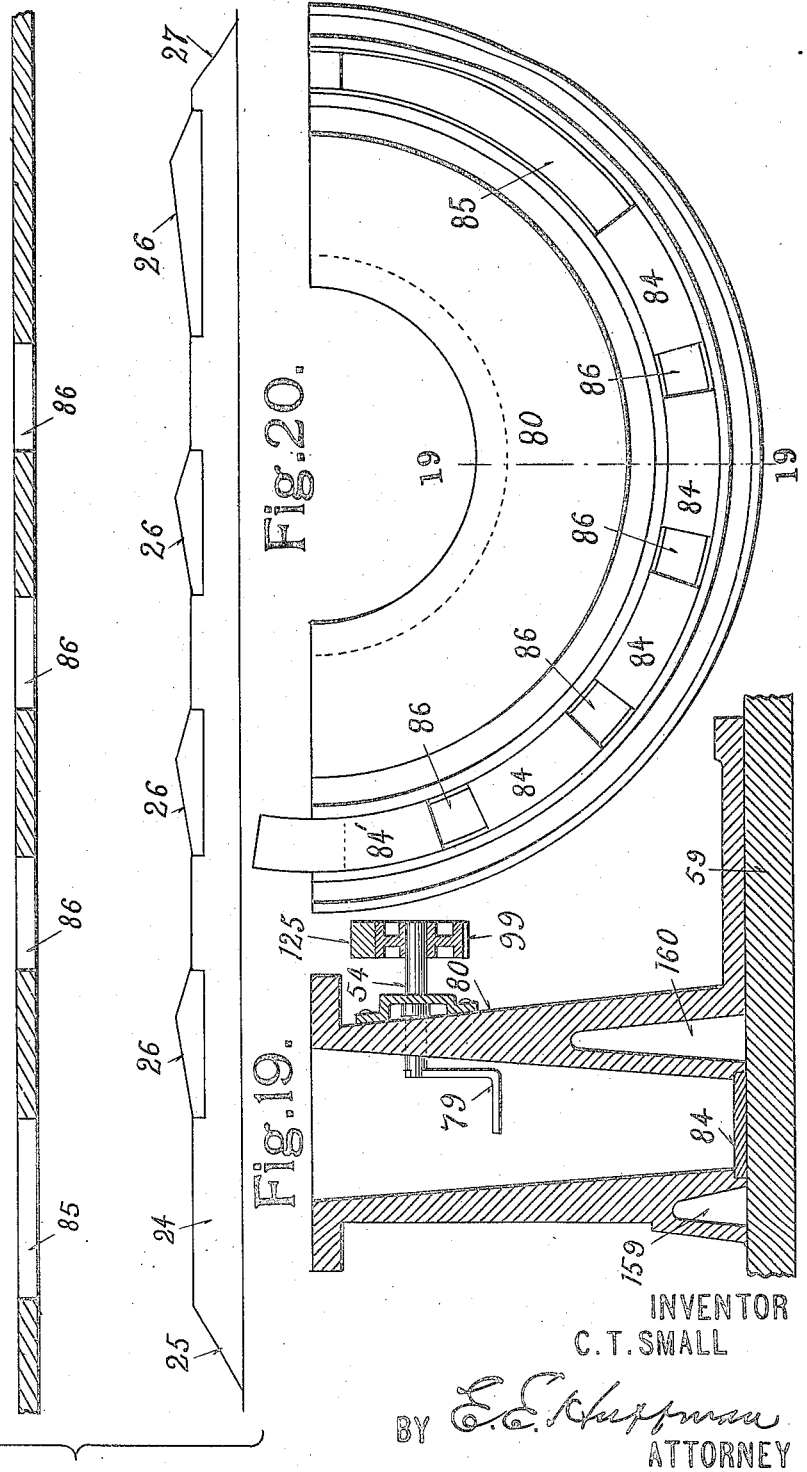

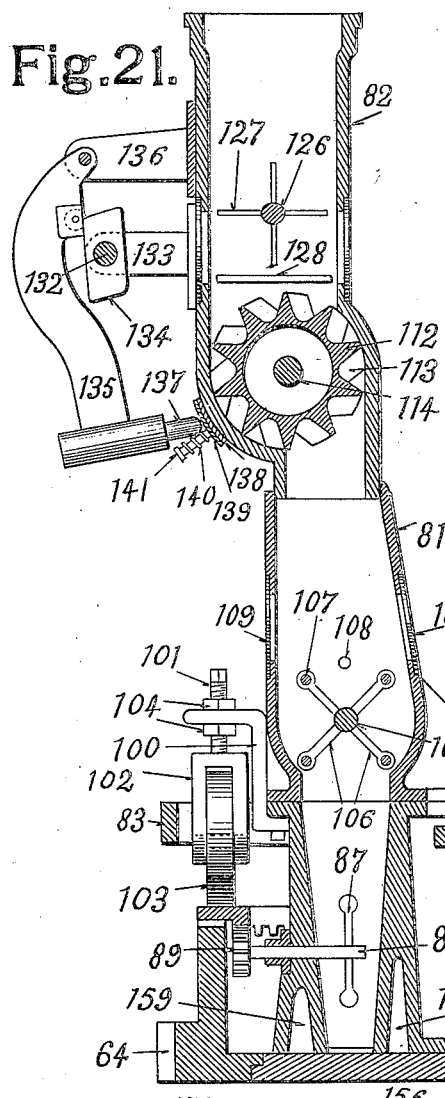
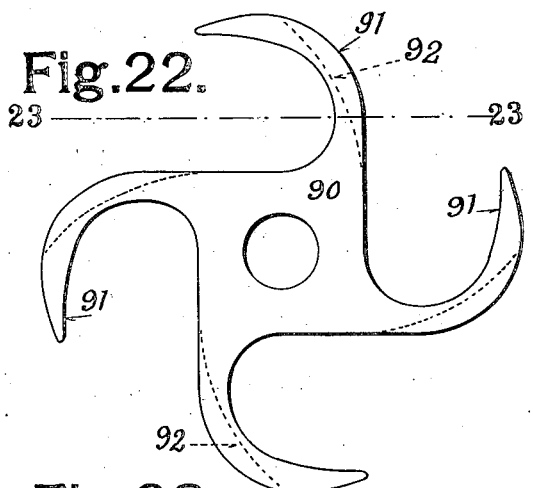
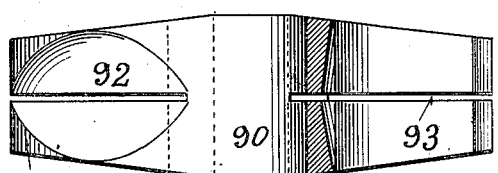
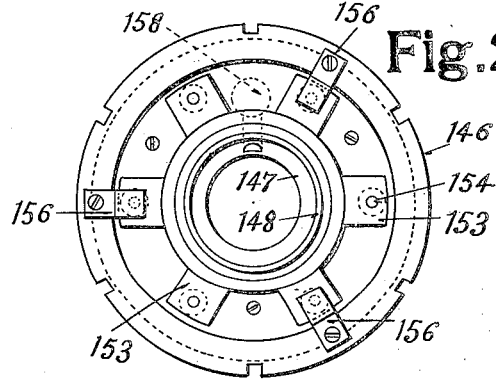

June 24, 1930.　　　　　C. T. SMALL　　　　　1,766,263
CAN FILLING MACHINE
Filed Feb. 17, 1926　　　15 Sheets-Sheet 12
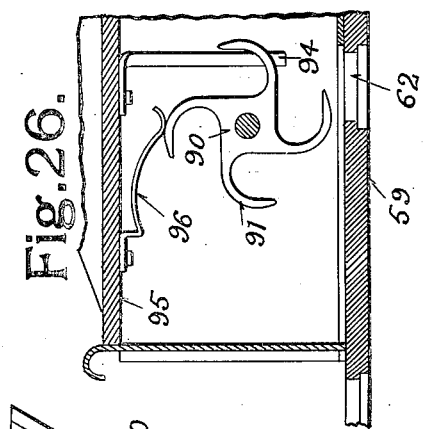
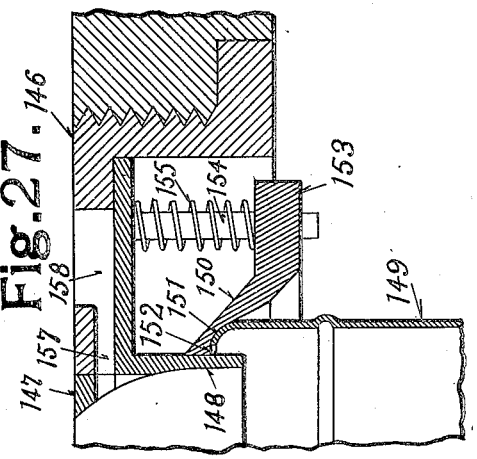
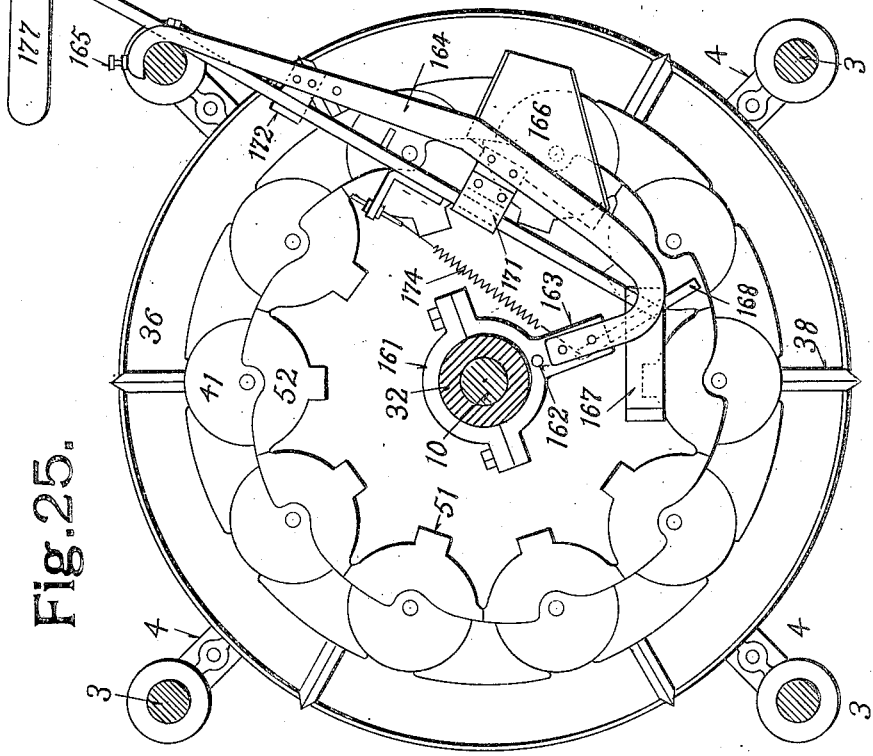
INVENTOR
C.T. SMALL
BY
ATTORNEY June 24, 1930.  C. T. SMALL  1,766,263
CAN FILLING MACHINE
Filed Feb. 17, 1926  15 Sheets-Sheet 13

INVENTOR
C.T.SMALL
BY *E. E. Huffman*
ATTORNEY

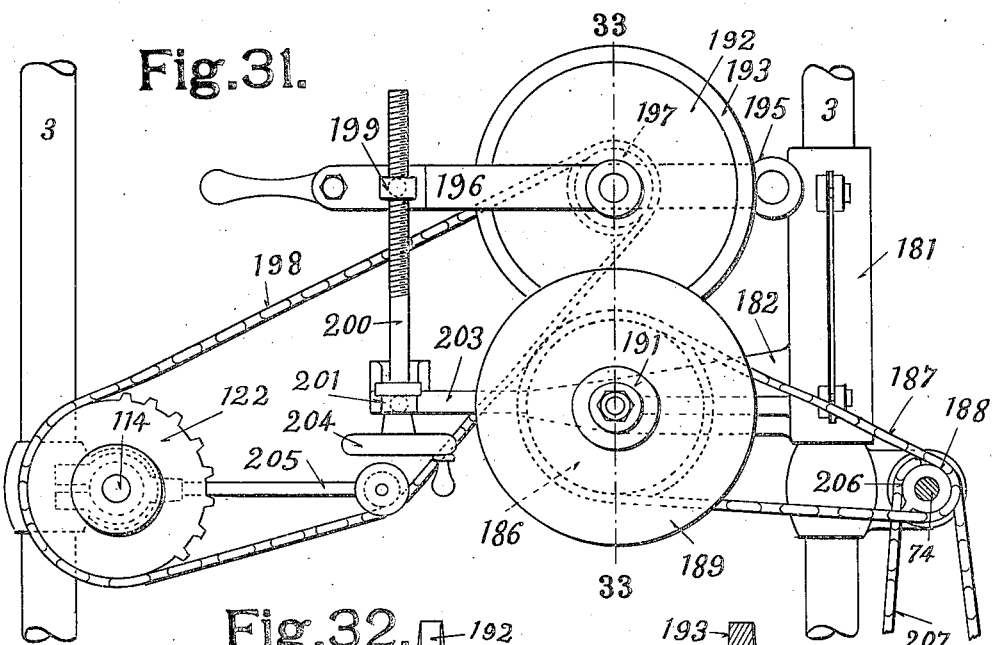
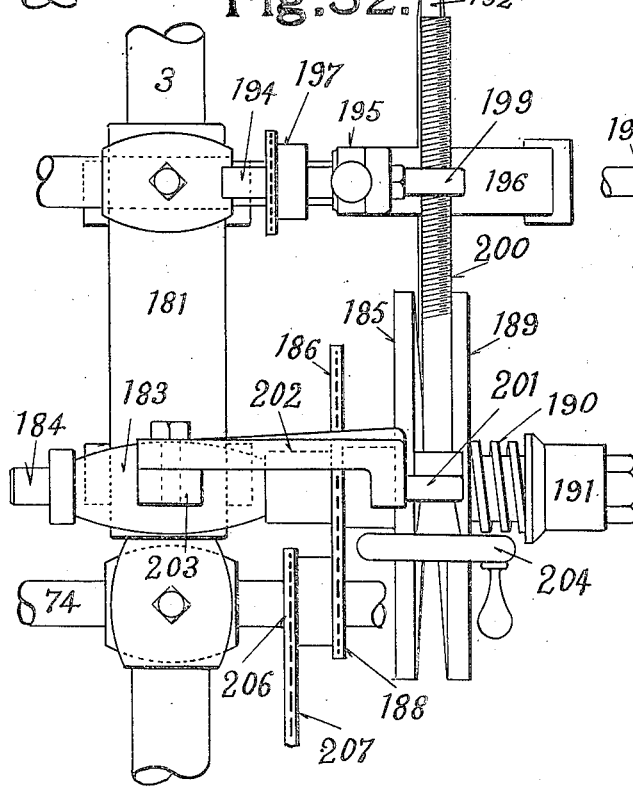
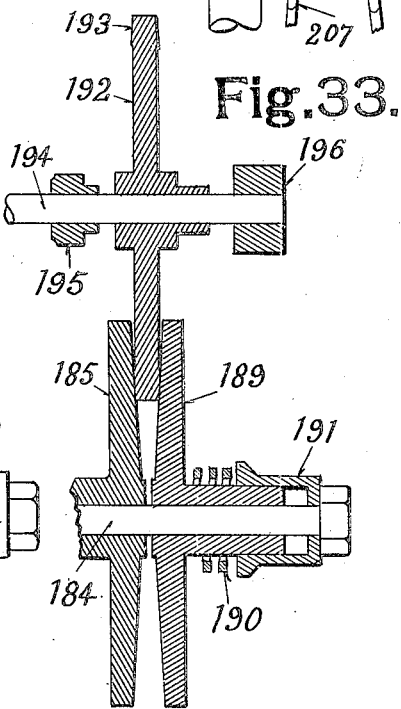

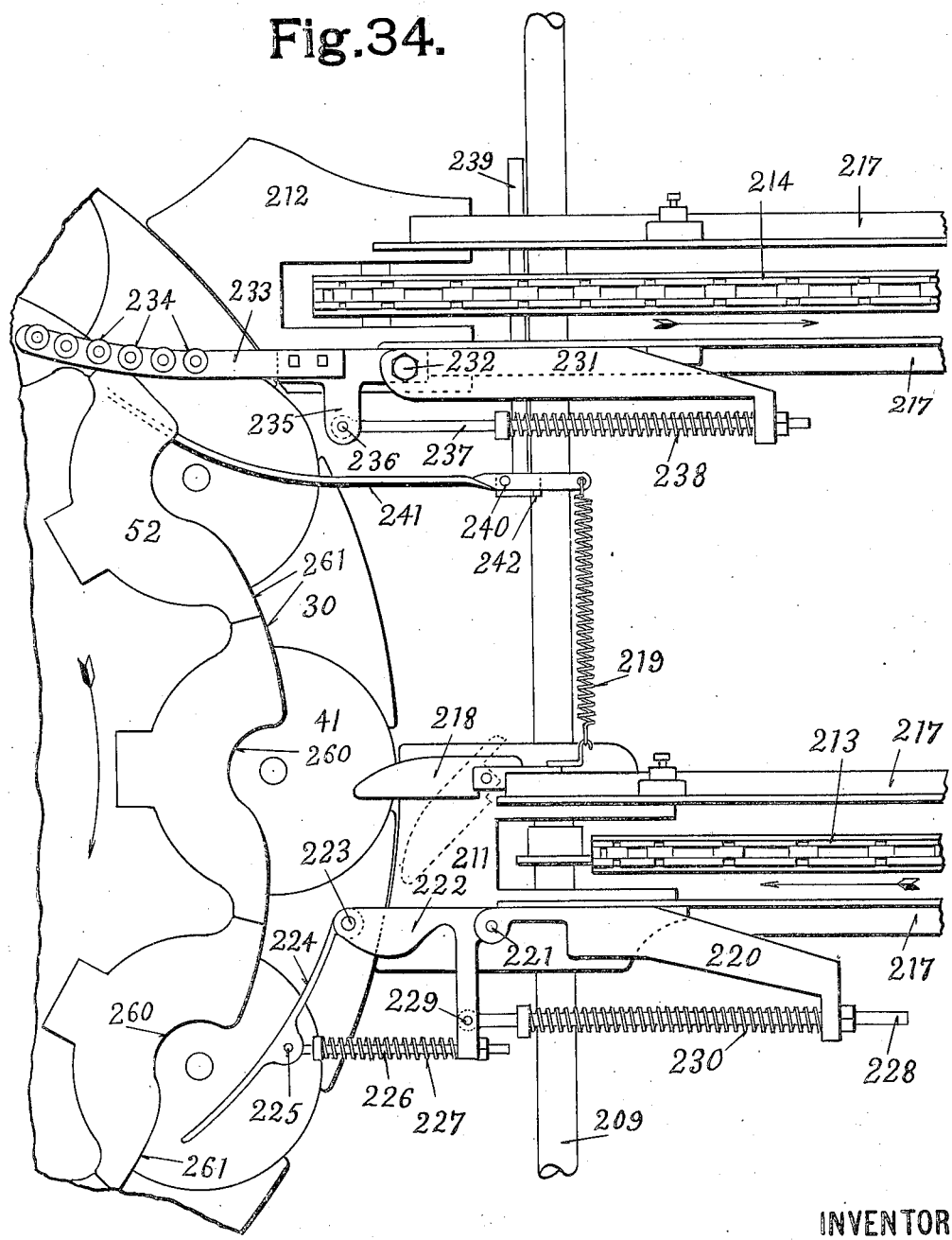

Patented June 24, 1930

1,766,263

UNITED STATES PATENT OFFICE

CHESLEY T. SMALL, OF ST. LOUIS, MISSOURI

CAN-FILLING MACHINE

Application filed February 17, 1926. Serial No. 88,765.

My invention relates to a can filling machine and particularly to a machine for filling cans with powders or pulverized materails. The exact form of machine disclosed is designed especially for filling cans with snuff but with or without modifications it can be adapted to handling a large variety of materials.

Figure 1:
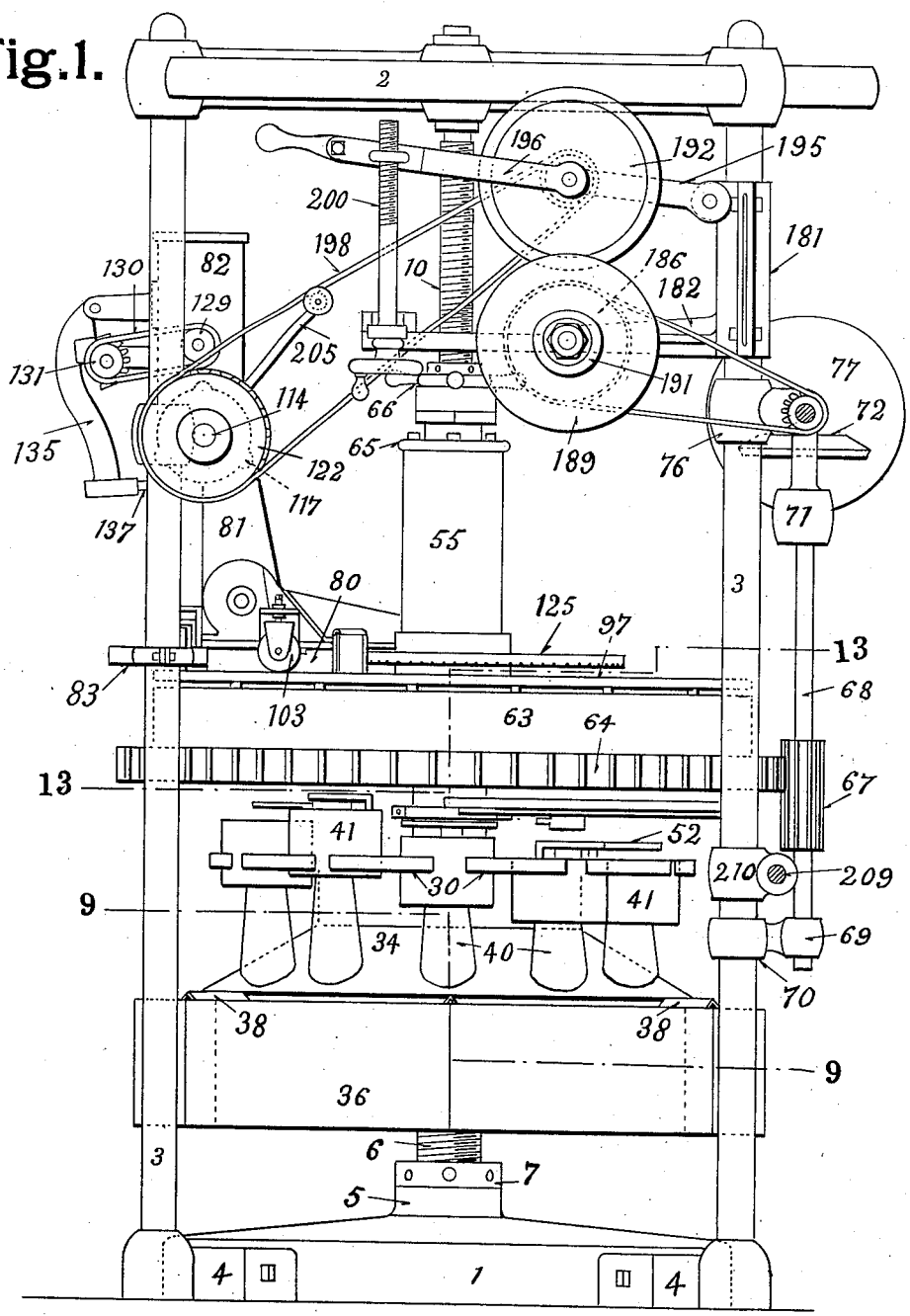
Figure 9:
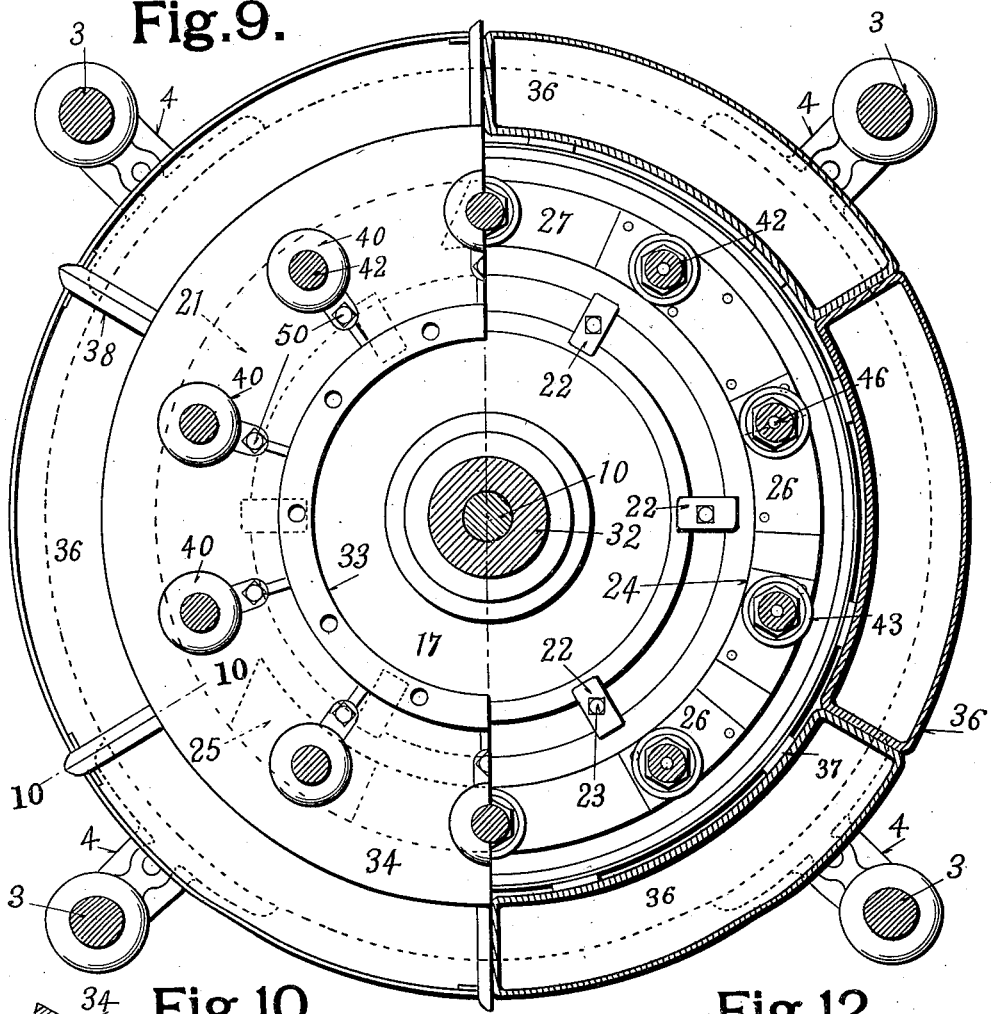
Figures 10, 11:
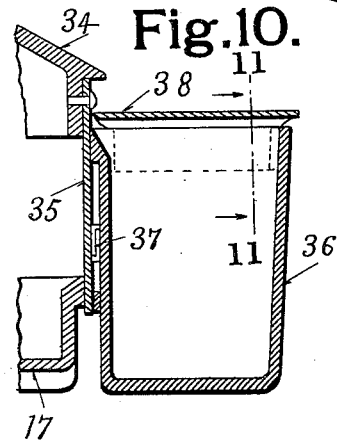
Figure 12:
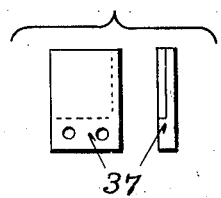
Figure 13:
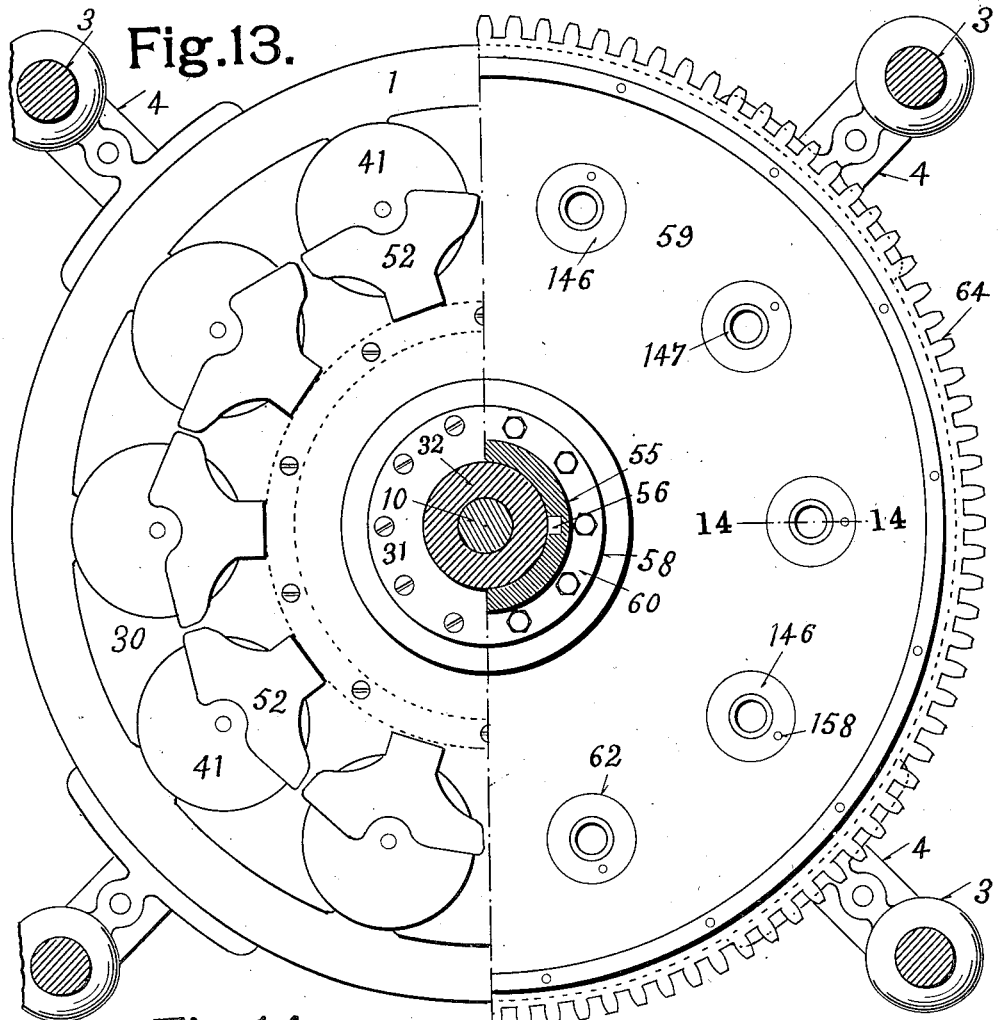
Figure 14:
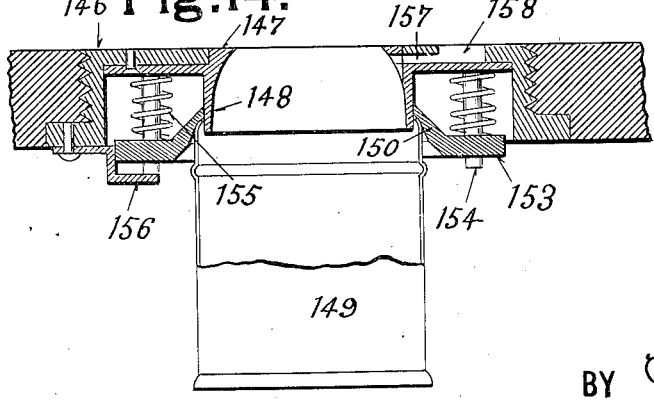
Figure 28:
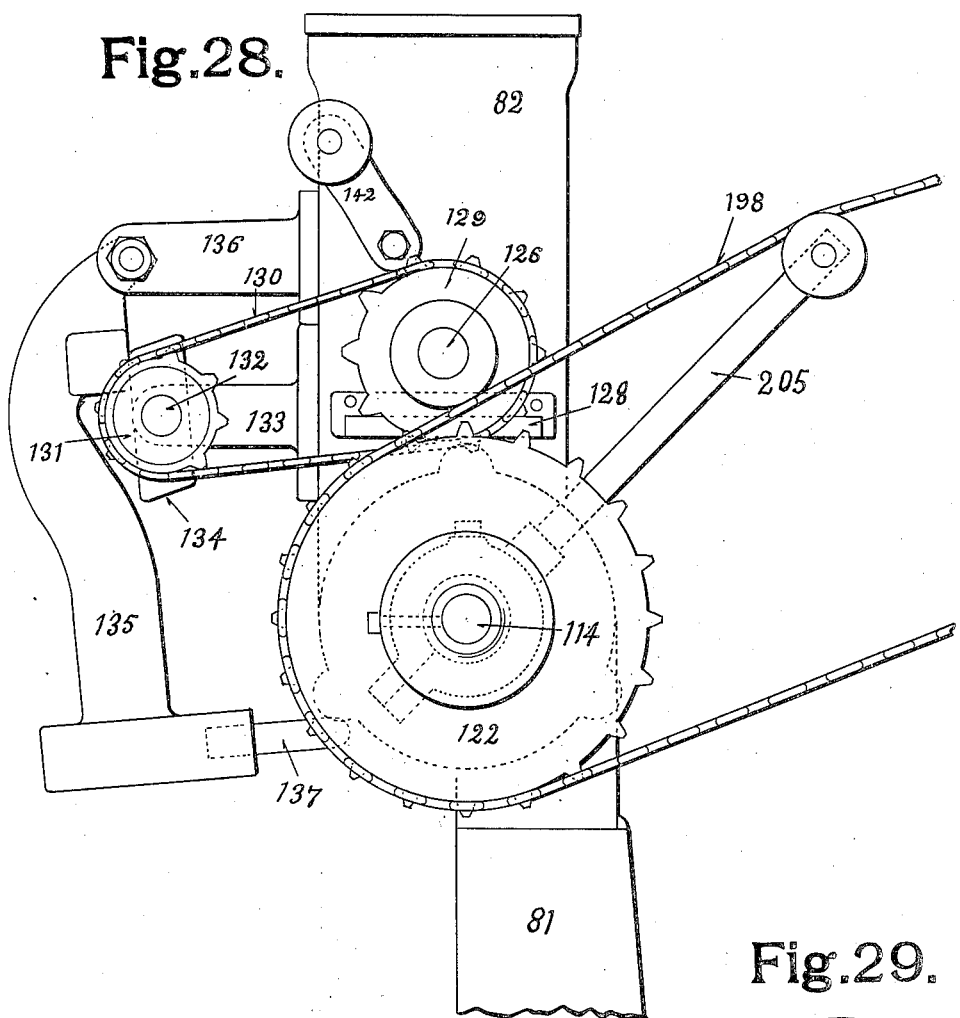
Figure 29:
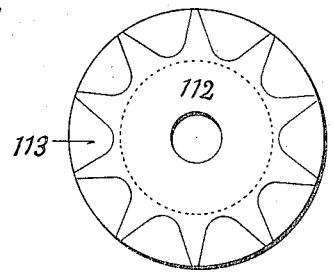
Figure 30:
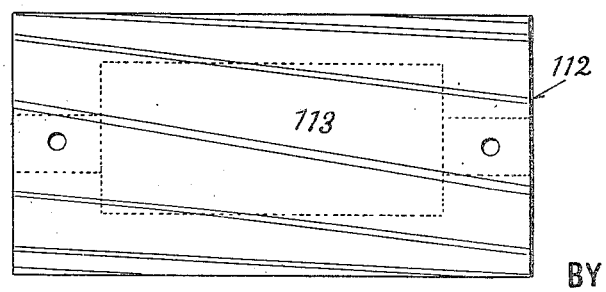

In the accompanying drawings which illustrate one form of filling machine made in accordance with my invention, Figure 1 is a side elevation, some of the driving gear being broken away and the conveyor and transfer mechanism being omitted; Figure 2 is a front view; Figure 3 is a rear view; Figure 4 is an enlarged section taken on the line 4—4 of Figure 6; Figure 5 is a still further enlarged detail view of some of the parts shown in Figure 4; Figure 6 is a top plan view, partly in section, also showing the conveyors; Figure 7 is a plan view of the leveling device; Figure 8 is a section taken on the line 8—8 of Figure 7; Figure 9 is an enlarged section on the line 9—9 of Figure 1; Figure 10 is a section taken on the line 10—10 of Figure 9; Figure 11 is a section taken on the line 11—11 of Figure 10; Figure 12 is a detail of one of the fastening clips shown in Figures 9 and 10; Figure 13 is an enlarged section taken on the line 13—13 of Figure 1; Figure 14 is an enlarged section taken on the line 14—14 of Figure 13; Figure 15 is a sectional view of one of the reel bearings; Figure 16 is an enlarged plan view of the can knock-out and automatic stop device; Figure 17 is a side view of the parts shown in Figure 16; Figure 18 is a diagrammatic view illustrative of the can packing mechanism; Figure 19 is an enlarged section on the line 19—19 of Figure 20; Figure 20 is a bottom plan view of the hopper; Figure 21 is a vertical section through the hopper and some of the adjacent parts; Figure 22 is an enlarged side view of the stirrer and packer in the lower part of the hopper; Figure 23 is a section taken on the line 23—23 of Figure 22; Figure 24 is a bottom plan view of one of the caissons; Figure 25 is a section taken on the line 25—25 of Figure 3; Figure 26 is a vertical section through one end of the lower part of the hopper; Figure 27 is an enlarged cross sectional detail of some of the parts shown in Figure 14; Figure 28 is an enlarged end view of the upper part of the hopper and its driving gear; Figure 29 is an end view of the feed reel; Figure 30 is a side view of the feed reel; Figure 31 is a detail view of the variable clutch mechanism for driving the feed reel; Figure 32 is a view taken at right angles to Figure 31, the rear upright being omitted; Figure 33 is a section taken on the line 33—33 of Figure 31; and Figure 34 is a detail view showing the inner ends of the conveyors.

The frame of the machine comprises a base 1, a top piece or spider 2 and four uprights, three extending between said parts. The uprights 3 do not engage directly with the base but are set in feet 4 which are removably secured to the base by bolts or other fastening means. I find that this construction facilitates not only the correct positioning of the uprights but also the necessary machining operations on the base. The base 1 has a central hub 5 (Figures 4 and 5) the bore of which receives the lower end of an externally threaded sleeve 6. The height of the sleeve may be regulated by a nut 7 threaded on the sleeve and resting on the hub 5. Closing the lower end of the sleeve 6 and supporting an antifriction ball 8 is a plate 9, as best shown in Figure 5. Resting on the ball 8 is the lower end of the central shaft 10, the upper end of which is journaled in the hub of the spider 2. Formed in the sleeve 6 is a key way 11 into which a key 12 carried by the hub 5 projects thus preventing rotation of the sleeve. An oil pool 13 is formed in the upper end of the sleeve 6 to provide a supply for oiling not only the bearing between the sleeve and shaft but also the shaft supporting bearing 8. As the plate 9 makes an oil tight joint with the lower end of the sleeve an oil reservoir is provided for both these bearings. A washer 14 covers the groove 13 to prevent the entry of dust. It may be slid upwardly on the shaft to give access to the groove to supply oil. Surrounding the threaded sleeve 6 above the hub 5 is a pan 17 having a hub 18 with a smooth bore through which the sleeve passes. The pan may be adjusted in height relative to the sleeve by means of a pair of nuts 19 having threaded engagement with the sleeve and arranged one above and the other below the hub 18. A key 20 carried by the hub 18 enters the key way 11 and prevents relative rotation of the pan and sleeve. Formed in the bottom of the pan 17 is an annular groove in which a track 21 is secured by means of clamping blocks 22 and bolts 23. The purpose of this track is to control the vertical movement of the individual can supports hereinafter to be described. Extending through about one-half of the circumference of the track is a raised portion 24 (shown in Figure 4) having an initial incline 25 for raising the cans to filling position, a number of secondary inclines 26 for packing the material, and a terminal incline 27 for returning the cans to normal height. In the diagrammatic view I have shown four secondary inclines 26, while in the actual construction more may be required, corresponding to the number of openings in the bottom of the hopper, as shown in Figure 20, but the number of these may be varied in accordance with the size of the can or the nature of the material with which it is to be filled.

Arranged above the pan 17 is a can table 30 which is carried by a flange 31 on a sleeve 32 surrounding the center shaft 10. Depending from the can table is a casting having an upper cylindrical part 33 and a lower conical part 34 forming a guard to discharge waste material into the conserving receptacles hereinafter to be described. The conical part 34 is provided with a flange to which is secured a drum 35 of sheet metal. Detachably secured to the drum are the conserve receptacles 36, preferably six in number, the attachment being made by two sets of interlocking clips 37, one set being riveted to the drum and the other to the receptacles. It is to be noted that the conical part 34 extends slightly beyond the drum 35 to insure discharged powder entering the receptacles and that the adjacent ends of the receptacles are guarded by removable sheet metal sheds 38 which prevent powder passing down between the ends of the receptacles, thus conserving all material from becoming waste. (Figures 9, 10 and 11). The sleeve 32 is rigidly secured to the shaft 10 by a set screw 28.

Formed integral with the conical member 34 are bearings 40 corresponding in number to the individual can supports 41 with which the can table is supplied, in the present instance ten. The can supports are carried on stems 42, (see Figure 5) each of which terminates in a cage 43 containing a ball 44 forming an antifriction bearing on the track 21. Lateral openings 45 permit the free passage of oil to the balls 44, the pan 17 being filled with oil to about the height indicated by the broken line in Figure 5. In order that this oil may lubricate not only the balls 44 but also the bearings 40 I provide a wick 46 contacting with the top of each ball and extending up through a passage in the stem 42. This passage has a lateral extension 47 allowing the wick to apply oil to the interior of the bearing 40 as the individual can support is raised and lowered. Formed in the top of the bearing 40 is an oil groove 48 covered by a washer 49 to prevent surplus oil from running over onto the outside of the bearing and cone 34 and this causing dust or powder to adhere to the machine. An adjustable screw 50 limits the downward movement of the support 41 so as to insure its being flush with the top of the can table. Removably secured to each of the can supports 41 is the shank 51 of a can guide 52. By this construction the can guides cannot turn out of their proper position, hold the supports in place, and may be readily exchanged for others to adapt the machine to cans of a different diameter.

Surrounding the sleeve 32 is a larger sleeve 55 (Figure 4) having a key way 56 into which projects a key 57 carried by the sleeve 32 and preventing relative rotary movement of the two sleeves while permitting their relative longitudinal movement. The sleeve 55 is provided near its lower end with a flange 58 to which a disk 59 is secured by a clamping ring 60 and bolts 61. The bolt holes in the flange are slightly elongated so that the filling holes 62 in the disk may be brought into exact alignment with the centers of the can supports 41. Secured to the disk 59 is a flange 63 provided with gear teeth 64. Bolted to the upper end of the sleeve 55 is a cap forming one part of a swivel bearing, the other part of which comprises a hand wheel 66 threaded on shaft 10 and providing means for raising and lowering the disk 59 relatively to the can table 30.

Meshing with the gear teeth 64 is an elongated pinion 67 carried on a vertical shaft 68. (Figures 1, 2 and 6). The lower end of the shaft 68 is journaled in a bearing 69 carried by a cross-bar 70 extending between the front uprights 3. The upper end of the shaft 68 is journaled in yoke 71 and is provided with a gear 72. Bearings 73 on the ends of the yoke surround a shaft 74 carrying a gear wheel 75 meshing with the gear 72. Carried on the front uprights 3 and supporting the shaft 74 are a pair of bearings 76. Mounted on one end of the shaft is a clutch 77 controlled by a handle 78 and also serving as the driving pulley to which power is applied for running the machine. Power applied to the clutch through the gearing just described drives the can table 30 and disk 59 together with the parts carried thereby, which parts constitute the main moving elements of the machine. All the other moving parts are driven either directly or indirectly from the shaft 74 by gearing hereinafter to be described. At the end opposite to the clutch 77 the shaft 74 is provided with a hand wheel 78' by means of which the machine may be manually operated when desired, as for example, when making adjustments in the machine.

Making close contact with the disk 59 is the lower face of a hopper device (Figure 21) comprising three parts, the lower part or hopper proper 80, an intermediate or distributer part 81, and an upper part or feed reel device 82. Carried by the hopper 80 is an anchor bar 83 the ends of which surround the rear uprights 3 to prevent the hopper from rotating. The fit, however, is sufficiently loose to allow vertical movement of the hopper. As shown in Figure 20 the bottom of the hopper is partially closed by plates 84 so as to provide a long initial opening 85 and four shorter openings 86. The terminal plate 84' should extend a short distance beyond the hopper as shown. Above each of the openings 85 and 86 a stirrer is arranged in the hopper, those above the openings 86 being all similar and consisting of arms 87 having paddle-shaped ends and carried by short shafts 88 journaled in the wall of the hopper and provided outside the hopper with pinions 89. The stirrer above the elongated opening 85 is of special construction and operates not only as a stirrer but also as a packing device to force the material into the cans. As shown in Figures 22, 23 and 26 this special stirrer consists of a body portion 90 carrying four curved arms 91 in the forward face of each of which is a concave recess 92. Each of the arms is also provided with a slit 93 for the passage of a thin strip of metal 94 to loosen and remove any material which may become packed in the recess 92. This strip 94 is secured to an extension 95 of the distributer chamber 81 which extension forms a cover for the end of the hopper. The extension 95 also carries a spring tappet 96 adapted to strike the arms and assist in removing the material. Secured to the upper edge of the flange 63 is a track 97 provided with gear teeth 98 meshing with the pinions 89 to operate the stirrers. In order that the weight of the hopper device may not rest on the disk 59, thus causing undue friction and wear, I provide wheel supporting devices, preferably three in number, for carrying its weight. (See Figures 1, 6 and 21). Each of these supports comprises a Z-shaped bracket 100 secured to the upper flange of the hopper 80, and a threaded stem 101 passing through the horizontal part of the bracket and carrying a yoke 102 in which is mounted a wheel 103 bearing on the track 97. On the stem 101 at each side of the horizontal part of the bracket is a nut 104. By means of these nuts the wheel may be accurately adjusted in a vertical direction so that the bottom of the hopper may be in close proximity to or even in actual contact with the disk 59 and at the same time the entire, or nearly the entire weight of the hopper device will be supported from the track.

The distributing device 81 interposed between the feed reel device and the hopper increases in cross sectional area from the top to bottom to allow the snuff or other material passing through it to expand and thus fall freely into the hopper. In its lower part is situated a distributing reel comprising a shaft 105 provided with radial arms 106 in the ends of which are carried cross-bars 107. Owing to the shape of the distributing chamber it is impossible to insert the reel in assembled form. I therefore provide one of the end walls with an opening 108 so situated that the ends of the arms 106 may be brought into alignment with it and the cross-bars 107 inserted through it. Glazed openings 109 are preferably provided in the front and rear walls to allow inspection of the contents. Shaft 105 is journaled in bearings 110 (as shown in Figure 3) secured to the end walls and preferably made to provide a packing similar to that of the feed reel bearings to be hereinafter described. One end of the shaft is provided with a sprocket wheel 111 by means of which it may be driven from any suitable moving part but preferably from some part of the feed reel mechanism so that it will maintain the same speed relative to the feed reel.

The feed reel device 82 contains adjacent to its lower end the feed reel 112 (shown in detail in Figures 29 and 30, and in cross section in Figure 21). This reel is cylindrical in form and has formed in its periphery a number of grooves 113 extending spirally from end to end. These grooves are V-shaped in cross section with rounded bottoms so as to reduce to a minimum the tendency of the snuff or other material to pack in the grooves. The spiral grooves cause the material to drop in a gradual shower and not flutter as in all former fluted feed reels with straight grooves. A shaft 114 carries the reel and is journaled in a pair of bearings 115, one of which is shown in detail in Figure 15. Forming the inner end of this bearing is a disk-shaped part 116 adapted to enter the opening in the end of the reel casing through which the reel is inserted and to be bolted to said end by lugs 117 so as to form a tight joint. The body of the bearing is separated from the disk 116 by an opening 118 extending vertically through the bearing. In this opening is a partition wall 119 between which and the disk is a packing 120 of fibrous material. An oil cup 121 provides lubricant to the body of the bearing. Lubrication is thus confined to the body of the bearing and the oil prevented from access to the contents of the feed chamber. Packing 120 serves a double purpose. As the shaft openings in disk 116 and wall 119 are unlubricated they are necessarily of comparatively large diameter to prevent friction and hence would allow of the escape of some of the material from the feed chamber without this packing. On the other hand the packing intercepts any minute quantity of oil which may creep along the shaft across the space 118.

Secured to one end of the shaft 114 is a sprocket wheel 122 (Figure 1) driven through the medium of a variable clutch mechanism hereinafter to be described. At the other end is a gear wheel 123 meshing with a gear wheel 124 on an agitator shaft 126. This shaft passes through the feed reel chamber above the feed reel and is provided with stirring arms 127. Arranged between the agitator shaft and the feed reel are a pair of slides 128 the purpose of which is to prevent entrance into the reel of foreign material while the machine is being shipped or otherwise out of operation. They are removed when the machine is in use. On the shaft 126 at the opposite end from the gear wheel 124 is a sprocket wheel 129 connected by a sprocket chain 130 with a sprocket wheel 131. (See Figure 28). Sprocket wheel 131 is carried on a shaft 132 mounted in brackets 133 secured to the rear wall of the chamber 82. Mounted on shaft 132 is a cam 134 contacting with a hammer arm 135 pivoted to a bracket 136 and having a head provided with a striking pin 137 preferably of hard wood. The action of the cam is to alternately raise the hammer arm and allow it to drop so that the pin 137 will strike the wall of the reel chamber adjacent to the reel and loosen any material adhering to the reel. I have found that this constant hammering if applied directly to the wall is injurious to the machine. I therefore interpose a cushioning device comprising a bottom strip 138 of leather, rubber, or similar soft material, and a top strip 139 of metal against which the pin strikes. These strips are yieldingly held in position by coil springs 140 surrounding bolts 141 passing through the strips and screwed into the wall of the chamber, thus taking up the rebound of the block on which the hammer strikes and protecting against any damage to the parts. A chain tightener 142 may be used to take up the slack of the chain 130. Mounted on the shaft 126 at the opposite side of the feed chamber from the wheel 129 is a sprocket wheel 143 connected by a chain 144 with the sprocket wheel 111 on the shaft 105. The slack of the chain 144 may be taken up by a tightener 145 mounted on the adjacent bearing 115.

The arrangement of agitators in the hopper 80, above described, gives satisfactory results with many kinds of material but it may be necessary to vary the arrangement of the agitators in accordance with the nature of the material handled. For example snuff, for which the exact form of machine is designed, tends to pack in the upper part of the hopper. I therefore provide the hopper, in addition to the primary agitators 87, with one or more secondary agitators preferably arranged above and between the primary agitators. Each of the secondary agitators comprises a short shaft 54 (Figure 19) carrying on its inner end an L-shaped arm, and on its outer end a pinion 99 driven from a gear wheel 125 on the sleeve 55. The action of the arm 79 is to loosen any material which may become packed in the upper part of the hopper and thus insure its free flow through the hopper.

Threaded into each of the filling openings 62 is a device which I term a caisson (see Figures 14, 24 and 27) comprising a hollow annular member 146 in which is secured a material shaping mold 147 having a downwardly projecting flange 148 the outer diameter of which is slightly less than the internal diameter of the top of the cam 149 which is to be filled. Surrounding the flange 148 is a guide 150 having an annular concave groove 151 to receive the rounded upper edge of the can. This groove terminates in a flat portion 152 (Figure 27) to avoid forcing the edge of the can into contact with the flange 148 and thus causing the can to cling to the flange. Carried by the guide 150 are lugs 153 each provided with an opening sliding on a pin 154 carried by the member 146. Coil springs 155 surround the pins 154 and tend to force the guide downwardly. This downward movement is limited by Z-shaped stops 156 secured to the lower edge of the member 146 and so proportioned as to hold the guide as soon as the can is free from the flange 148. In order to allow the air to escape from the can as it is being filled I form a passage 157 in the guide 147 and member 146 terminating in a port 158 in the latter. This port communicates with a vent 159 formed in the bottom of the hopper 80 which vent is preferably open to the atmosphere at each end of the hopper. In addition to the vent 159 I provide the hopper with a second vent 160 so that the caisson may be turned around with the port 158 at the inside instead of the outside, or in case of a larger can two ports may be used instead of one.

Notwithstanding the precaution taken to prevent the cans from adhering to the flange 148 imperfect cans may become clamped on the flange or wedged in the guide 150. In order to eject such cans from the machine I provide the mechanism shown best in Figures 16, 17 and 25. A split collar 161 loosely surrounds the sleeve 32 below the disk 59. An adjustable bolt 162 projects downwardly from the collar with its head bearing on the flange 31 to support the collar at the proper height. Adjustably secured to an arm 163 carried by the collar is an ejecting bar 164 the opposite end of which is attached to one of the uprights 3 by bolts 165. Carried by the ejecting arm is a trough 166 (omitted from Figure 17) into which any cans which fail to drop with their supports 41 are knocked by the the bar and are by the trough deposited in the conserve receptacle 36. Carried by the bar 164 is a guard 167 adapted to engage the can guide 52 of any support 41 which has failed to drop by gravity and return it to normal position. Should the guard 167 fail to completely perform its function of returning a support 41 to normal position, or should any other obstruction occur on the can table which might injure the machine, such unreturned support or obstruction will come in contact with an arm 168 pivoted at 169 to bar 160 sliding in guides 171 and 172 carried by the ejector bar 164. The arm 168 is normally held with the stop 173 (Figure 16) against the edge of the bar 170 by a spring 174 attached to the end of the arm and a threaded rod 175 adjustably carried in a bracket 176 on the bar 170. When an obstruction strikes the arm 168 the bar 170 is slid in its guides 171 and 172 causing an extension 177 on the arm to move the handle 78 and thus throw out the clutch 77 to stop the machine. The movement of the bar is limited by a stop pin 178 on it striking a stop pin 179 on the ejector bar 164. Owing to the momentum of the moving parts the machine will not stop immediately when the clutch is thrown out so the obstruction is allowed to pass by the swinging of the arm 168 on its pivot 169 against the tension of the spring 174. The bar 170 is returned to normal position by forcing it toward the left hand (Figure 16) until a stop pin 180 carried by it comes in contact with the guide 172.

To vary the speed of the feed reel I drive it by means of a variable clutch mechanism shown in Figure 1 and in detail in Figures 31, 32 and 33. A sleeve 181 is clamped on one of the front uprights 3 and carries an arm 182 provided with a hub 183 in which is journaled a shaft 184. Mounted on said shaft is a friction disk 185 on the hub of which is a sprocket gear 186 connected by a sprocket chain 187 with a sprocket gear 188 on the driving shaft 74. A second friction disk 189 is mounted on the shaft 184 adjacent to the disk 185 and is forced toward it by a coil spring 190 surrounding its hub and bearing against a cap 191 adjustably secured to the end of the shaft. The opposing faces of these disks are slightly beveled as shown in somewhat exaggerated form in Figure 33. Arranged between these disks is a third friction disk 192 having, adjacent to its periphery on each side, a narrow portion 193 beveled to correspond to the bevel on the opposing faces of the disks 186 and 189. The disk 192 is mounted on a shaft 194 so as to rotate therewith but to be capable of slight longitudinal movement relative thereto. This shaft is journaled at the inner side of the disk in an arm 195 pivoted to the sleeve 181 and at the outer side thereof in a Z-shaped piece 196 attached to said arm. On the shaft 194 adjacent to the arm 195 is a sprocket wheel 197 around which passes a sprocket chain 198 which also passes around a sprocket wheel 122 driving the feed reel. In order to swing the arm 195 on its pivot and thus move the disk 192 relative to the disks 185 and 189 and so vary their relative rates of speed, said arm is provided with a swiveled internally threaded eye 199 engaged by a threaded rod 200. The rod 200 is journaled in a swiveled block 201 carried by an arm 202 mounted on an extension 203 of the arm 182 and has at its lower end a hand wheel 204 by means of which it may be rotated to raise or lower the arm 195. A chain tightener 205 is necessary to compensate for the raising and lowering of the disk 192. By rotating the hand wheel 204 the speed of the feed reel relative to the main rotating part of the machine may be nicely adjusted. By this means the supply of material to the hopper and the discharge therefrom into the cans may be exactly equalized under varying conditions so that the hopper and distributing chamber neither become under or over charged. This is of importance in securing a uniform quantity of material in each can.

On the shaft 74 adjacent to the sprocket wheel 188 is a sprocket wheel 206 connected by sprocket chain 207 with a sprocket wheel 208 on shaft 209. (See Figure 2.) This shaft is journaled in bearings 210 carried by the front uprights. The object of this shaft is to drive the conveyors shown in Figure 6 and in detail in Figure 34. It is to be noted that while the conveyors in Figure 6 are for a left-hand machine; that is, one rotating in a contra-clockwise direction, those shown in the detail in Figure 34 are for a right-hand machine, the machine being capable of change from right to left hand operation by reversal of the conveyors and a few other parts, as for example, the track 21 and hopper 80. The conveyor comprises a landing plate 211, a discharge plate 212 with their corresponding travelling chains 213 and 214 respectively. The method of driving the chains from the shaft is similar to that described in my prior Patent No. 1,474,176 granted November 13, 1923, and will not be here described in detail. The plates 211 and 212 are supported from the cross-bar 70 by brackets 215 and 216 respectively and each carries a pair of guide rails 217. Pivoted to the inner guide rail over the landing plate 211 is a finger 218 normally held in the position by the cans themselves passing by it but which may yield a pivot to allow of discharge of cans laterally to the left as shown in dotted lines in case of a gorge in the feed system. Secured to the opposite guide rail is a bracket 220 to which is pivoted at 221 an L-shaped piece 222, one arm of which forms a continuation of the guide rail and has pivoted to it at 223 a curved finger 224. Pivoted to the finger 224 at 225 is a rod 226 extending through the other arm of the piece 222, and surrounded by a coil spring 227 which holds the finger 224 in position to yieldingly force the cans into the central recesses of the can guards 52. The piece 222 is normally held in the position shown by a rod 228 pivoted to said piece at 229 and surrounded by a coil spring 230 bearing against an offset of the bracket 220 through which the rod passes. While in the ordinary operation of the machine only the finger 224 will yield to allow the passage of cans and at the same time seat them in the can guards, any obstruction of greater size will cause the piece 222 to swing on its pivot against the resistance of the spring 230 and thus allow the passage of the obstruction. Carried by the inner rail 217 over the plate 212 is a bracket 231 having pivoted at 232 an extracting finger 233, preferably slightly curved for guiding the filled cans onto the said plate 212. In order to reduce the friction between the cans and this arm it is provided with a number of rollers 234 the peripheries of which extend slightly beyond its forward edge. The extracting finger is provided with a lateral extension 235 to which is pivoted at 236 a rod 237 surrounded by a coil spring 238. This spring 238 bears against an extension of the bracket 231, through which the rod passes, and normally holds the extracting finger in the position shown but allows it to fold back under the pressure of an unusual obstruction so that the obstruction may pass. Carried by the rails 217 is a bar 239 having pivoted to its inner end at 240 a cleaning finger 241 lying on the can table 30 to remove from said table any surplus material from the cans or any small object that may have fallen thereon. The finger is normally held against a stop 242 by a spring 219 which is attached to the rail 217. It will be noted that the curvature of the face of the finger 224 is substantially equal to the distance of its pivot from the center of the can table but that its normal position is somewhat eccentric thereto. Each of the can guides 52 has a central recess 260 eccentric with the can support and its cooperating caisson and these recesses are connected by faces 261 forming a continuous curved cam between each pair of recesses. The form of the guides, together with the form and position of the finger is of great importance in properly seating the cans.

In Figures 6, 7 and 8 I have shown a device for leveling the material which projects somewhat above the top of the can as it comes from the machine. This device is attached to the discharge conveyor. A pair of side bars 244 are supported from the conveyor by rods 245, which are preferably extended to the opposite conveyor to give additional support. Carried by the bars 244 is a U-shaped support 246 having journaled in its upper end a shaft 247 on which is mounted a drum 248. A heavy belt 249 passes around this drum and a smaller drum 250 mounted on a shaft 251 journaled in a U-shaped support 252. As it is necessary that the distance of the lowest point of the belt above the chain 214 be exactly equal to the height of the can I secure the support 246 to the rails 244 by bolts passing through slots 253 so that the said support may be adjusted vertically. The support 252 is pivotally secured to the bars 244 by trunnions 254 so that it may be inclined to tighten the belt. It is held in position by bolts passing through arcuate slots 255. Mounted on the shaft 247 is a driving sprocket wheel 256 which is connected to a sprocket wheel 257 on the shaft 209 by a sprocket chain 258. The relative diameter of the wheels 256 and 257 should be such that the surface speed of the belt is exactly the same as the speed of the chain 214. The shaft 251 is preferably provided with a loose pulley 259 to prevent contact of the shaft with the chain 258.

The operation of my machine, briefly described, is as follows: The cans are placed upon the conveyor chain 213 either by hand or by any suitable feeding device and are carried forward by this chain and deposited on the landing table 211 and thence forced onto the can table 30. The finger 224 forces a can into the recess of each can guard 52 so as to center it directly under one of the caissons. As the can is carried forward the ball 44 of its individual holder 41 (Figures 4 and 5) comes in contact with the incline 25 of the track 21 so that the holder and can are raised until the can engages with the caisson, as best shown in Figure 14, slightly compressing the springs 155 and thus making a tight joint with the guide 150. This takes place just before the mouth of the caisson passes under the long opening 85 in the hopper bottom. The length of the opening is sufficient to allow the can to be completely filled and the material is packed to a certain degree by the action of the combined stirrer and packer 90. After the can passes from under the opening 85 the ball 44 comes in contact with the first incline 26 causing the can to be further raised. During this latter raising operation the mouth of the caisson is closed by one of the plates 84 with the result that the material in the can is compressed after which the can is lowered leaving an empty space in the mold 147 above the compressed material. This space is filled when the can passes under the opening 86 and the material is again compressed by the second incline 26. This filling and compressing is repeated as many times as there are inclines 26 on the track. After the last compression the can is disengaged from the caisson by the passage of the ball 44 down the terminal incline 27. At this stage of the operation of the machine a portion of the material projects above the top of the can in a dome-shaped mass corresponding to the mold 147 of the caisson. The amount of material so projecting should be just sufficient to fill the space left in the can by the flange 148 of the mold. The can is extracted by the finger 233 and directed onto the chain 214 by which it is carried under the belt 249 of the leveling device which forces the projecting portion of the material into the can leaving the contents level and flush with the top of the can.

Wherever in the specification or claims I have referred to cans I wish to be understood as including receptacles of any form or material.

Having fully described my invention, what I claim as new and desire to secure by Letters Patent of the United States is:

1. In a device of the class described, the combination with a supporting frame, of a vertical shaft carried thereby, a rotary can table having a top, vertically movable individual can holders carried by stems and forming a part of said table top, a conical shed extending beneath said holders, and upwardly extending bearings for the holder stems on said shed, said holders being provided with downwardly projecting flanges surrounding the upper ends of said bearings.

2. In a device of the class described, the combination with a supporting frame, of a vertical shaft carried thereby, a rotary can table on said shaft, a conical shed extending below said table to deflect material falling therefrom, and an annular conserve receptacle below said shed to receive the material discharged therefrom, said receptacle being formed of independently removable sections.

3. In a device of the class described, the combination with a supporting frame, of a vertical shaft carried thereby, a rotary can table on said shaft, a conical shed below said table, can supports, a conserve receptacle to receive material deflected by said shed, an actuating device enclosed by said receptacle, and means for vertically adjusting said actuating device relatively to the table.

4. In a device of the class described, the combination with a supporting frame, of a vertical shaft carried thereby, a rotary can table on said shaft, a conical shed below said table, a conserve receptacle to receive material deflected by said shed, said receptacle being formed in a plurality of removable sections, and shields connecting the adjacent ends of said sections.

5. In a device of the class described, the combination with a base, of an externally threaded sleeve in said base, means for preventing relative rotation between the sleeve and the base, means for vertically adjusting said sleeve, and a track carrying member vertically adjustable on said sleeve.

6. In a device of the class described, the combination with a base, of an externally threaded sleeve in said base, means for preventing relative rotation between the sleeve and the base, means for vertically adjusting said sleeve, a track carrying member vertically adjustable on said sleeve, a rotary shaft carried by said sleeve, a second sleeve on said shaft, and individual can supports carried from said second named sleeve and operated from said track.

7. In a device of the class described, the combination with a base, of an externally threaded sleeve in said base, means for preventing relative rotation between the sleeve and the base, means for vertically adjusting said sleeve, a track carrying member vertically adjustable on said sleeve, a rotary shaft carried by said sleeve, a second sleeve on said shaft, a can table carried by said second named sleeve, individual can supports for said table, and means including anti-friction bearings for actuating said can supports from said track.

8. In a device of the class described, the combination with a base, of an externally threaded sleeve in said base, means for preventing relative rotation between the sleeve and the base, means for vertically adjusting said sleeve, an oil pan vertically adjustable on said sleeve, a track in said oil pan, a rotary shaft carried by said sleeve, a second sleeve on said shaft, a can table carried by said second named sleeve, a third sleeve surrounding said second named sleeve, and a feed disk carried by said third named sleeve.

9. In a device of the class described, the combination with a base, of an externally threaded sleeve in said base, means for preventing relative rotation between the sleeve and the base, means for vertically adjusting said sleeve, an oil pan vertically adjustable on said sleeve, a track in said oil pan, a rotary shaft carried by said sleeve, a second sleeve on said shaft, a can table carried by said second named sleeve, a third sleeve surrounding said second named sleeve, a feed disk carried by said third named sleeve, and means for adjusting said third named sleeve vertically in relation to said second sleeve.

10. In a device of the class described, the combination with a can table, of a feed disk above said table, a hopper cooperating with said disk, and anti-friction bearings for supporting the hopper from the disk.

11. In a device of the class described, the combination with a can table, of a feed disk above said table, a hopper cooperating with said disk, anti-friction bearings for supporting the hopper from the disk, and means for vertically adjusting said anti-friction bearings.

12. In a device of the class described, the combination with a feed disk, a hopper for said disk, and a stirrer in said hopper provided with curved arms forming a packing device, said curved arms being provided with concaves in their forward faces.

13. In a device of the class described, the combination with a feed disk, a hopper for said disk, a stirrer in said hopper provided with curved arms forming a packing device, slits in said arms, and a blade entering said slits to remove adhering material.

14. In a device of the class described, the combination with a feed disk, a hopper for said disk, a stirrer in said hopper provided with curved arms forming a packing device, slits in said arms, a blade entering said slits to remove adhering material, and a spring tappet cooperating with said arms.

15. In a device of the class described, the combination with a hopper having a plurality of discharge openings, of abutments between said openings, means for successively moving the can toward the hopper to compress the charges of material therein against said abutments.

16. In a device of the class described, the combination with a stationary hopper having a plurality of discharge openings, of abutments between said openings, a travelling feed plate, can carrying devices moving with the feed plate, and means for successively moving the can carrying devices toward the feed plate to compress the material in the can against said abutments.

17. A caisson for can filling machines comprising a mold having a flange adapted to project into the can, a telescoping guide on said flange for engaging the edge of the can, and an air vent leading from a point below the top of the mold.

18. A caisson for can filling machines comprising a member adapted to be removably secured to a filling disk, a mold carried by said member and provided with an inwardly curved upper end and with a flange, a guide carried by said flange and cooperating with a can, and an air vent leading from the mold at a point below the top thereof.

19. In a device of the class described, the combination with a hopper having a bottom outlet, of a mold in said outlet having a flange, and a guide telescoping on said flange, said guide having an annular flared part terminating in a concave groove to receive the edge of the can, said groove terminating in a flat face adjacent to the flange.

20. In a device of the class described, the combination with a hopper provided with an air duct, of a telescoping caisson comprising a mold provided with a flange, a guide sliding on said flange, and an air vent leading from the mold at a point below the top thereof and communicating with the vent in the hopper.

21. In a device of the class described, the combination with a rotary can table, of a filling disk above said table, a hopper cooperating with said disk, a feed control device, and a distributing chamber between said control device and hopper, the cross sectional area of said distributing chamber increasing from top to bottom.

22. In a device of the class described, the combination with a rotary can table, of a filling disk above said table, a hopper cooperating with said disk, a feed control device, a distributing chamber between said control device and hopper, the cross sectional area of said distributing chamber increasing from top to bottom, and an agitating device in said distributing chamber.

23. In a device of the class described, the combination with a rotary can table, means for raising and lowering cans on said table, of a can conveyor leading from said table, and a knock-out device operating at a point above the lowered cans, said device acting to eject an unlowered can at a point other than the conveyor.

24. In a device of the class described, the combination with a rotary can table, of individual can supports carried by said table, means for raising the supports above their normal position flush with the table, and a guard above said table contacting with and returning said individual supports to normal position.

25. In a device of the class described, the combination with a rotary can table, of individual can supports carried by said table, means for raising said supports above their normal position flush with the table and to lower them, a can conveyor leading from the table, means for discharging cans on said conveyor, a knock-out device for discharging cans at a point other than the conveyor, and a guard carried by said knock-out device for returning said supports to normal position.

26. In a device of the class described, the combination with a can table, means for raising and lowering cans on said table, of a clutch controlling the movement of said table, a knock-out device operating at a point above the lowered cans, said device acting to eject an unlowered can, and a sliding bar carried by said knock-out device for actuating said clutch.

27. In a device of the class described, the combination with a can table, means for raising and lowering cans on said table, of a clutch controlling the movement of said table, a knock-out device operating at a point above the lowered cans, said device acting to eject an unlowered can, and a sliding bar carried by said knock-out device for actuating said clutch, said sliding bar having a contact member adapted to fold and allow the passage of an obstruction.

28. In a device of the class described, the combination with a rotary can table, of can filling means including a flange adapted to enter a can for forming a mound of powder projecting above the can, a member sliding on the flange and fitting over the can, and a levelling device for depressing the mound to the can level.

29. In a device of the class described, the combination with a rotary can table, of can filling means including a flange adapted to enter the can for forming a mound of powder projecting above the can, a member sliding on the flange and fitting over the can, a conveyor for removing the cans from the table, and a levelling device cooperating with the conveyor to depress the mound to the can level.

In testimony whereof, I hereunto affix my signature, this 15th day of February, 1926.

CHESLEY T. SMALL.